E. McEWIN.
Wheel-Cultivator.

No 49,540. Patented Aug 22, 1865.

UNITED STATES PATENT OFFICE.

EZRA McEWEN, OF LISBON, ILLINOIS, ASSIGNOR TO HIMSELF AND HENRY R. FOWLER.

IMPROVED CULTIVATOR.

Specification forming part of Letters Patent No. 49,540, dated August 22, 1865.

*To all whom it may concern:*

Be it known that I, EZRA McEWEN, of Lisbon, in the county of Kendall and State of Illinois, have invented a new and useful Improvement in Cultivators; and I do hereby declare that the following is a full, clear, and exact description of the same, reference being had to the accompanying drawings, and the letters and figures marked thereon, which form part of this specification.

Figure 1:
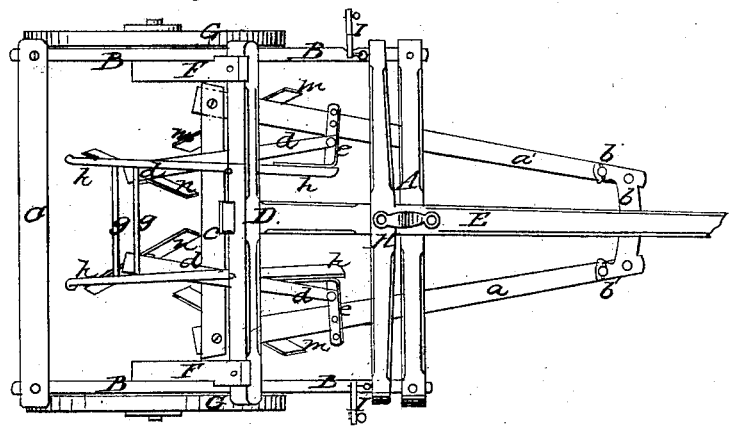
Figure 2:
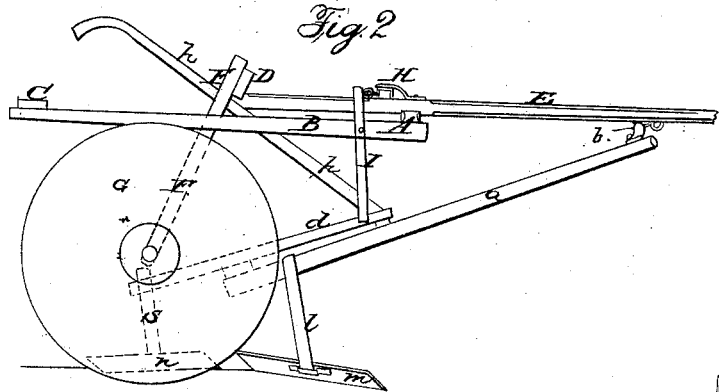

In said drawings, Figure 1 represents a plan or top view of my invention; Fig. 2, a side elevation of the same, and Fig. 3 a top view of that part of the machine to which the shears are attached when arranged as hereinafter described.

Similar letters of reference in the several figures denote the same parts of my invention.

My invention has reference to that class of cultivators which stride the rows of plants to be cultivated; and it consists in a novel arrangement whereby the machine may be adapted to cultivating the corn when small, and by a simple and easy adjustment and arrangement may be adapted to the cultivation of the corn when of taller and larger growth, while at the same time the construction of the machine is very cheap and simple.

To enable those skilled in the art to understand the construction and operation of my invention, I will proceed to described the same with particularity, making reference to the aforesaid drawings.

A B represent a frame of timbers of suitable dimensions, the cross-beam A being rigidly attached to the front ends of the longitudinal beams B B, which are supported near the middle upon the upright posts F F, the lower ends of which are attached to the short axles of the wheels G G. Across the rear ends of the beams B B is placed the seat C, and the upper ends of the posts F F are connected by the cross-beam D.

E represents the draft pole or tongue of the machine, and is rigidly attached to the cross-beams A and D.

H represents the evener, and I I are two vertical single-trees, to the lower ends of which the horses are attached to draw the machine.

$a\ a$ represent the two beams to which the plows or shares are attached, and are connected at the front ends by the cross-bar $b$, provided with arms, as shown, extending down upon each beam, and provided with the transverse slots $b'\ b'$, with the set-screws therein, for the purposes of bracing and strengthening the joints, and also to allow the rear ends of said beams to be adjusted at different distances apart, as might be desired. Across the said rear ends of the said beams $a\ a$ is placed the cross-bar $c$, the ends being fastened thereto by such attachment as would allow the said cross-bar $c$ to be readily removed, if desired. Near the rear ends of the said plow-beams $a\ a$ are attached the standards $l$, to the lower ends of which are attached the scrapers or shares, (marked $m$,) which are so arranged as to throw the earth and soil in toward the row of plants being cultivated.

$h\ h$ represent the handles, whereby the cultivators are guided and controlled, which are connected to the beams $a\ a$ by the iron straps or bars $e\ e$, which are bent at such an angle that while one end is firmly fastened upon said beams $a\ a$ the other ends are firmly attached to the handles, as shown, thus forming a strong rigid connection between the handles $h\ h$ and beams $e\ e$.

$d\ d$ represent two short beams, arranged as shown in Figs 1 and 2, the front ends being removably attached to the aforesaid iron straps $e\ e$, and the rear ends extending back of the cross-bar $c$, to which also they are attached, as aforesaid. Near the rear ends of said beams $d\ d$ are attached the standards $f$, to the lower ends of which are placed the scrapers $n$, which are arranged a little higher than the aforesaid scrapers $m$, and inclined in the opposite direction, so as to throw back and clear away from the young corn the excess of soil and coarse lumps and stones which the scrapers $m$ may have thrown upon the same. When the corn has attained a sufficient growth to render such care and protection unnecessary, then the beams $d\ d$ and the cross-bar $c$ may be removed, and the standards $f$ and scrapers $n$ may be attached to the beams $a\ a$, as shown, by changing them from one side to the other, when the whole machine is opened up to the braces $g\ g$ between the handles, and readily passes over the tall corn without in any way interfering with or injuring the same.

In this case the cultivator-frame, aside from the carriage or sulky part thereof, consists simply of the beams *a a*, cross-bar *b*, and handles *h h*, they being firmly braced and strengthened by the cross-rods *g g*, before mentioned, which is a much simpler and cheaper arrangement than any now in use.

It will be observed that the only connection between the wheeled frame and the cultivator proper is at the front end of the latter, where it is connected by a hook and staple in such a manner as to allow perfect freedom in motion either vertically or laterally.

By means of pins projecting from the cross-beam D and loops or staples upon the handles *h h* the cultivator may be raised and suspended clear from the ground, when desired.

Having now described my improved cultivator, I will specify what I claim as new therein and desire to secure by Letters Patent.

I claim—

1. The combination and arrangement of the draft-pole E, the plow-beams *a a*, the cross-bar *b″*, provided with the slots *b′ b′*, cross-bar *c*, beams *d d*, shares *m n*, and handles *h*, as and for the purposes specified.

Figure 3:
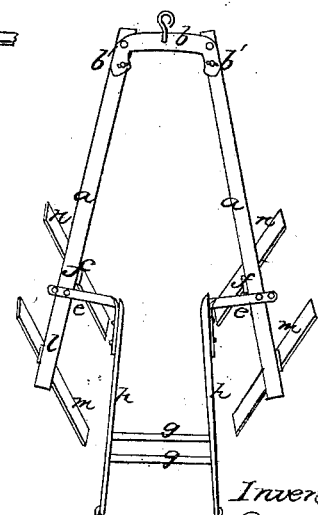

2. The combination and arrangement of the plow-beams *a a*, cross-bar *b*, slotted as shown, handles *h*, connecting-strips *e e*, and shares *m n*, as shown in Fig. 3, substantially as shown and set forth.

EZRA McEWEN.

Witnesses:
WM. McEWEN,
HORACE MOORE.